(12) United States Patent
Park

(10) Patent No.: US 7,633,529 B2
(45) Date of Patent: Dec. 15, 2009

(54) IMAGING APPARATUS, AND A METHOD FOR SWITCHING BETWEEN CHROMATIC AND MONOCHROMATIC MODES OF AN IMAGING APPARATUS

(75) Inventor: Eun-young Park, Siheung-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 768 days.

(21) Appl. No.: 10/983,242

(22) Filed: Nov. 8, 2004

(65) Prior Publication Data

US 2006/0098103 A1    May 11, 2006

(51) Int. Cl.
*H04N 5/225*    (2006.01)

(52) U.S. Cl. .............. 348/217.1; 348/216.1; 348/229.1; 348/222.1; 348/207.99

(58) Field of Classification Search .......... 348/143–160
See application file for complete search history.

(56) References Cited

U.S. PATENT DOCUMENTS

| | | | | |
|---|---|---|---|---|
| 5,172,220 | A * | 12/1992 | Beis ............................ | 348/262 |
| 6,943,839 | B1 * | 9/2005 | Matsumoto et al. .... | 348/333.01 |
| 2002/0006284 | A1 * | 1/2002 | Kim ............................ | 396/429 |
| 2002/0152557 | A1 * | 10/2002 | Elberbaum ...................... | 8/405 |
| 2004/0117729 | A1 * | 6/2004 | Ariga ...................... | 715/500.1 |

FOREIGN PATENT DOCUMENTS

| | | |
|---|---|---|
| JP | P2001-45512 A | 2/2001 |
| JP | P2002-135788 A | 5/2002 |
| KR | 2003-0036484 | 5/2003 |

\* cited by examiner

*Primary Examiner*—David L Ometz
*Assistant Examiner*—Antoinette T Spinks
(74) *Attorney, Agent, or Firm*—Roylance, Abrams, Berdo & Goodman, L.L.P.

(57) ABSTRACT

A method for, and an imaging apparatus capable of, switching between chromatic and monochromatic modes in accordance with brightness of an object being imaged. The features of the method and the apparatus include, inter alia: determining whether the present mode is a chromatic mode or a monochromatic mode; if the present mode is the monochromatic mode, determining whether a minimum illumination, which controls time for receiving an image signal from the object, is set. If the minimum illumination is set, calculating the minimum illumination value; determining whether the calculated minimum illumination is below a certain minimum illumination threshold; and if the minimum illumination value is below the minimum illumination threshold, switching from the monochromatic mode to the chromatic mode. As such, the difference between brightness levels when switching to the chromatic mode and when switching to the monochromatic mode is sufficiently large such that wrong operation can be prevented when switching between the chromatic and monochromatic modes.

23 Claims, 3 Drawing Sheets

IMAGING APPARATUS, AND A METHOD FOR SWITCHING BETWEEN CHROMATIC AND MONOCHROMATIC MODES OF AN IMAGING APPARATUS

BACKGROUND OF THE INVENTION

1. Field of the Invention

The present invention relates to an imaging apparatus, and a method for switching between chromatic and monochromatic modes of an imaging apparatus. More particularly, the present invention provides an imaging apparatus and a method where switching between chromatic mode and monochromatic mode is improved so as to prevent incorrect operation.

2. Description of the Related Art

A visual surveillance camera such as CCTV has a day/night monitoring function such that a filter which filters the optical image received from a lens is switched according to a brightness of a subject, and an optimized image may be obtained. A chromatic mode is selected in daytime, and a monochromatic mode is selected at night. The chromatic mode is selected by switching on Infra-Red (IR) filter, and the monochromatic mode is selected by switching off the IR filter. Switching off the IR filter means selecting a focus filter. In general, the selection of chromatic mode and monochromatic mode is performed automatically according to a brightness of a subject calculated based on AE (Auto Exposure) function.

AE function operates to get an optimized image by adjusting a diaphragm, AGC (Auto Gain Control) gain and shutter speed, that is, by adjusting minimum illumination. If a subject is darker than a predetermined standard brightness, the diaphragm is opened to receive more light, AGC gain increases to amplify a brightness value of an input image signal, and the minimum illumination increases to slow the shutter speed and to receive the light for a longer period of time so that the image can be brighter. If a subject is brighter than a predetermined standard brightness, the diaphragm, the AGC gain and the minimum illumination are oppositely adjusted so that an image can be kept at a proper brightness.

FIG. 1 is a flowchart for explaining a conventional method for automatically switching between chromatic mode and monochromatic mode. Referring to FIG. 1, a brightness level of an image is read from AE data (S100). A determination whether the present mode is a chromatic mode or a monochromatic mode is performed (S110). If the present mode is a chromatic mode, then a determination whether to switch to a monochromatic mode is performed (S120). In general, a user in advance sets a brightness level, which is a basis for switching from a chromatic mode to a monochromatic mode, and usually the brightness level is approximately 40 to 60 IRE. The IRE (Institute of Radio Engineers) is a unit for expressing a video signal magnitude, 100 IRE is a maximum white level, and 0 IRE is a black level.

Assuming, for example, a monochromatic mode reference level for switching from a chromatic mode to a monochromatic mode is set to 50 IRE. Accordingly, if the brightness level calculated at step S100 is less than 50 IRE, and the present mode is a chromatic mode as determined at step S110, a switch is made to a monochromatic mode at step S130 based on the result of determination at step S120. On the other hand, if it is determined at step S110 that the current mode is a monochromatic mode, then at step S140 it is determined if the calculated brightness level is greater than a chromatic mode reference level, which is a threshold for switching to a chromatic mode. In general, the chromatic mode reference level is approximately 90 to 110 IRE, so the chromatic mode reference level may be set to, for example, 100 IRE. Accordingly, if a brightness level of a current image is greater than 100 IRE, a switch to a chromatic mode is performed at step S150. The brightness level of an image increases or decreases to the proximity of a predetermined reference level, according to the chromatic mode switching or the monochromatic mode switching.

However, if a chromatic mode or a monochromatic mode switching time is solely based on the brightness level read from the AE data as described above, difference between the chromatic mode reference level and the monochromatic mode reference level can not increase more than a certain value, due to AE function which keeps a constant brightness.

As such, if a certain type of light source such as a halogen lamp is used, when a chromatic mode is switched to a monochromatic mode, the brightness level of an image increases to approximately 80 to 120 IRE. The increase in the image brightness level would likely cause a switching back to the chromatic mode because the increased brightness level would likely be greater than 90 to 120 IRE, which is a monochromatic mode reference level above which switching to a chromatic mode from a monochromatic mode is performed. As a result of switching to the chromatic mode, the brightness level of an image becomes less than 40 IRE, and therefore, a flashing phenomenon may occur in which the switching process (back to the monochromatic mode) is repeated.

SUMMARY OF THE INVENTION

The present invention has been developed in order to solve the above drawbacks and other problems associated with the conventional arrangement. An aspect of the present invention is to provide a method for, and an imaging apparatus capable of, switching between chromatic and monochromatic modes, which can prevent the flashing phenomenon generated due to varying lightings by having a large interval between two thresholds which determine switching a chromatic mode to a monochromatic mode or a monochromatic mode to a chromatic mode.

According to an aspect of the present invention, there is provided a method for, and an imaging apparatus capable of, switching between chromatic and monochromatic modes in accordance with brightness of an object being photographed. The features of such a methods and apparatus comprise, inter alia: determining whether the present mode is chromatic mode or monochromatic mode; if the preset mode is determined to be the monochromatic mode, determining whether a minimum illumination, which controls time for receiving an image signal from the object, is set; if the minimum illumination is set, calculating the minimum illumination value; determining whether the calculated minimum illumination is below a certain minimum illumination threshold; and if the minimum illumination value is below the minimum illumination threshold, switching from the monochromatic mode to the chromatic mode.

According to another aspect of the present invention, the minimum illumination value may be controlled by an AE function which automatically sets an optimized exposure, and may be approximately a half of the greatest minimum illumination value available to an imaging apparatus.

According to another aspect of the present invention, the features further comprise, if the minimum illumination is not set: calculating an AGC gain which increments and decrements a brightness value of an image signal; determining whether the calculated AGC gain is below a predetermined AGC gain threshold; and if the calculated AGC gain is below the AGC gain threshold, switching to the chromatic mode.

According to another aspect of the present invention, the AGC gain may be controlled by an AE function which automatically sets an optimized exposure. The AGC gain threshold may be the smallest value among the AGC gains available to an imaging apparatus. The chromatic mode switching is performed by switching a filter of the imaging apparatus to an IR (Infra-red) filter.

According to another aspect of the present invention, the features of a method for, and an imaging apparatus capable of, switching between chromatic and monochromatic modes comprise, inter alia: if the present mode is determined to be a chromatic mode, calculating a brightness level of an input image based on the AE function; and if the brightness level is below a certain monochromatic mode reference level, switching to the monochromatic mode. The monochromatic mode switching is performed by switching the filter of the imaging apparatus to a focus filter. In an exemplary implementation, the imaging apparatus comprises a visual surveillance camera.

According to another aspect of the present invention, there is provided a method, for switching chromatic mode of an imaging apparatus, and an imaging apparatus capable of switching between a chromatic mode and a monochromatic mode based on a brightness of a subject. The features of the method and the apparatus comprise, inter alia: determining whether the present mode is a chromatic mode or a monochromatic mode; if the present mode is determined to be the monochromatic mode, calculating an AGC gain which increments and decrements a brightness value of an image signal; determining whether the calculated AGC gain is below a certain AGC gain threshold; and if the calculated AGC gain is below the gain threshold, switching to the chromatic mode.

According to another aspect of the present invention, the AGC gain may be controlled by an AE function which automatically sets an optimized exposure. The AGC gain threshold may be the smallest value among the AGC gains available to an imaging apparatus. The chromatic mode switching is performed by switching a filter of the image photographing apparatus to an IR filter.

According to another aspect of the present invention, the features of a method for, and an imaging apparatus capable of, switching between chromatic and monochromatic modes comprise, inter alia: if the present mode is determined to be a chromatic mode, calculating a brightness level of an input image based on the AE function; and if the brightness level is below a certain monochromatic mode reference level, switching to the monochromatic mode. The monochromatic mode switching is performed by switching the filter of the image photographing apparatus to a focus filter. In an exemplary implementation, the imaging apparatus comprises a visual surveillance camera.

BRIEF DESCRIPTION OF THE DRAWINGS

The above aspects and features of the present invention will be more apparent by reference to the detailed description of the embodiments of the present invention, and with reference to the accompanying drawings, in which.

DETAILED DESCRIPTION OF THE EMBODIMENTS OF THE INVENTION

Figure 1:
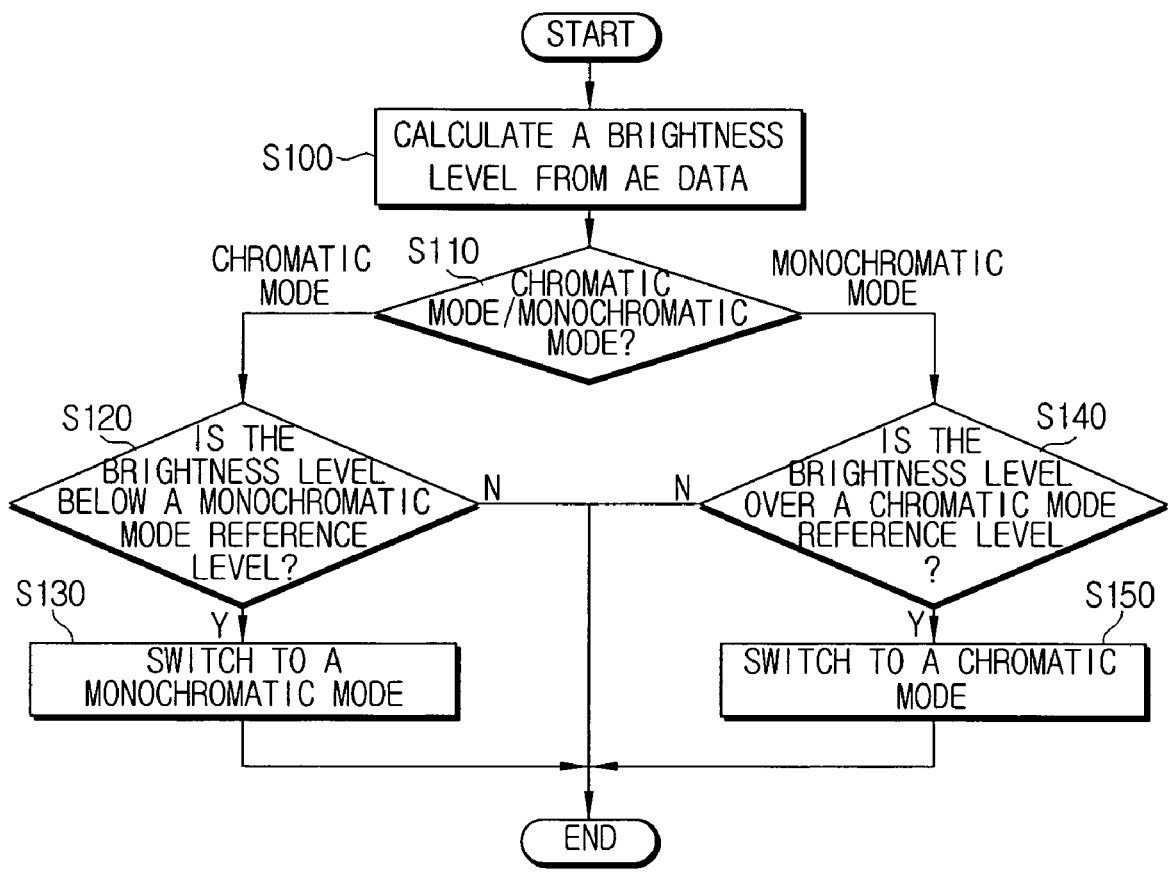
FIG. 1 is a flow chart illustrating a conventional method of automatically switching a chromatic mode and a monochromatic mode.

Certain embodiments of the present invention will be described in greater detail with reference to the accompanying drawings.

In the following description, same drawing reference numerals are used for the same elements throughout the drawings. The detailed description of certain features and method steps according to embodiments of invention are set forth to assist in a comprehensive understanding of the invention. A skilled artisan would readily appreciate that other implementations are possible without departing from the scope and spirit of the present invention. Also, well-known functions or constructions are not described in detail since such description may obscure the invention in unnecessary detail.

Figure 2:
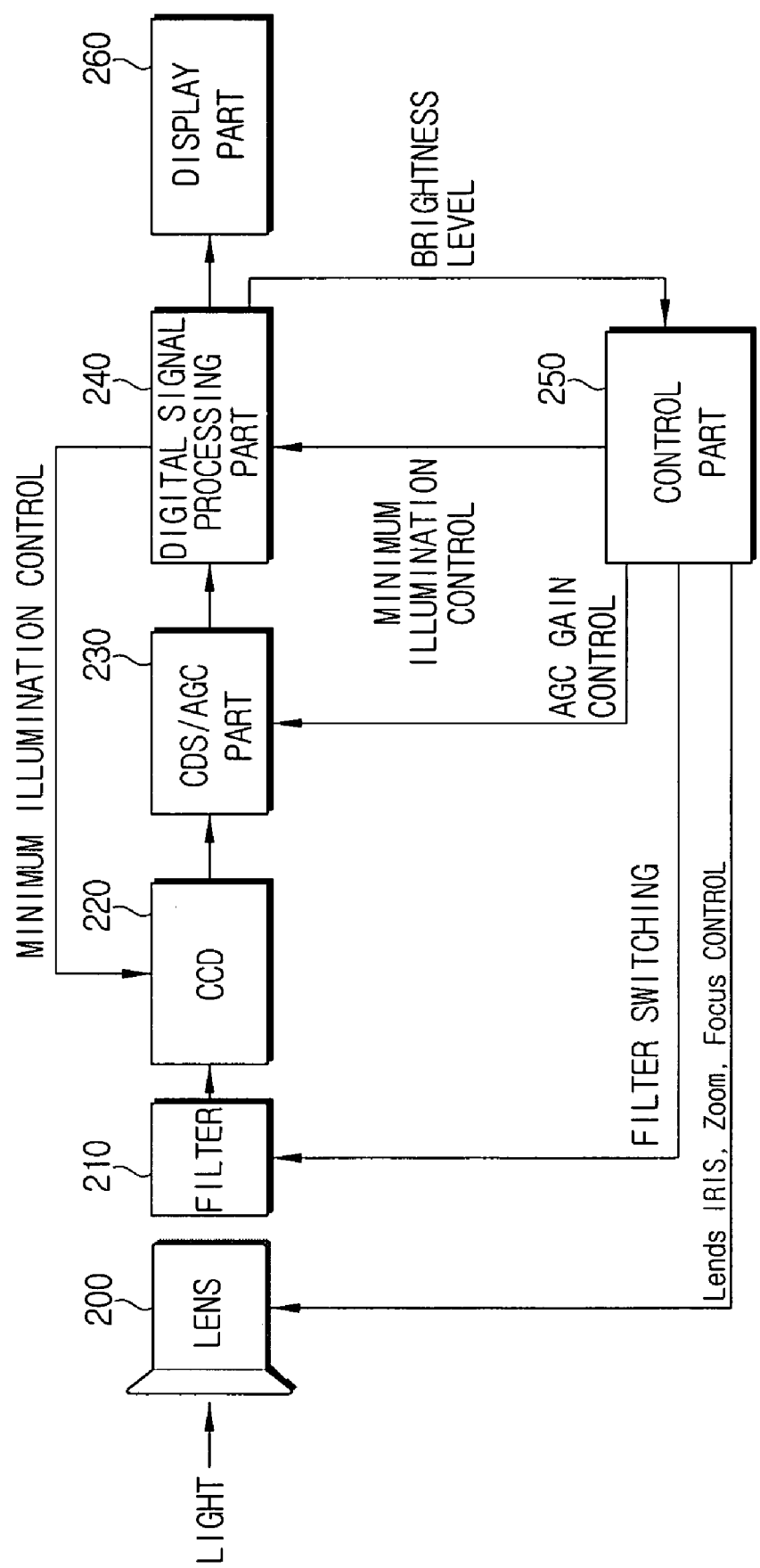
FIG. 2 is a block diagram of a visual surveillance camera according to an embodiment of the present invention.

FIG. 2 is a block diagram of a visual surveillance camera according to an embodiment of the present invention. Referring to FIG. 2, a visual surveillance camera according to an embodiment of the present invention comprises a lens 200, a filter 210, a CCD (charge-coupled device) 220, a CDS/AGC (correlated double sampling hold and automatic gain control) part 230, a digital signal processing part 240, a control part 250, and a display part 260.

The lens receives an optical image of an external object. The filter 210 filters the optical image received from the lens 200, and a proper filter such as an IR filter and a focus filter may be used as the filter 210 by a control of the control part 250 according to a brightness of an input image. The CCD 220 converges the received image signal and switches to an electric signal. The CDS/AGC part 230 removes noise from the electric image signal received from the CCD 220, and adjusts AGC gain to keep an image brightness such that an optimized image signal can be extracted. An A/D switching part (not shown) switches the signal received from the CDS/AGC part 230 to a digital signal. The digital signal processing part 240 processes the image signal received from the A/D switching part, and particularly calculates a brightness level from AE data of the image.

The control part 250 controls a diaphragm, the filter 210, CDS/AGC part 230 and the digital signal processing part 240 such that a brightness level of an image is always kept constant based on AE function. If the image brightness level is below a certain reference level, the control part 250 controls the CDS/AGC part 230 to adjust the AGC gain. The control part 250 controls the digital signal processing part 240 by user selection and adjusts a shutter speed so as to further control the minimum illumination. The control part 250 switches between a chromatic mode and a monochromatic mode based on the brightness calculated from the AE data, the AGC gain, and the minimum illumination.

If the minimum illumination is set and the present mode is a monochromatic mode, the AGC gain and the minimum illumination are at a maximum value. If the minimum illumination is below a certain minimum illumination threshold, an image is getting brighter, and the control part 250 switches the present mode to a chromatic mode. The minimum illumination threshold may be half of the greatest minimum illumination. In other words, if the greatest minimum illumination level is 128 units, the minimum illumination threshold may be set as 64 units.

If the minimum illumination is not set and the present mode is a monochromatic mode, the AGC gain is possibly set to the greatest value at the time of switching to a monochromatic mode. If the AGC gain is below a certain AGC gain threshold, the control part 250 determines that an image is getting brighter, and switches to a chromatic mode. The AGC gain threshold may be the smallest AGC gain obtainable by an imaging apparatus.

If a chromatic mode is set as the present mode, the control part 250 switches to a monochromatic mode when the present brightness value is below a certain monochromatic mode reference level based on a brightness value read from the AE data from the digital signal processing part 240. The control part 250 switches the filter 210 to the IR filter corresponding to a chromatic mode switching, and switches the filter 210 to a focus filter corresponding to a monochromatic switching.

If a monochromatic mode is switched to a chromatic mode as described above, the brightness value when switching is twice to three times as large as conventional 100 IRE. Accordingly, when the threshold is not changed at the time of switching to a monochromatic mode, the difference between two levels is about twice as large as the difference between conventional two levels such that conventional flashing can be prevented.

A D/A switching part (not shown) receives a digital image signal from the digital signal processing part 240 and switches to an analog signal, and the display part 260 displays an image corresponding to the image signal.

Figure 3:
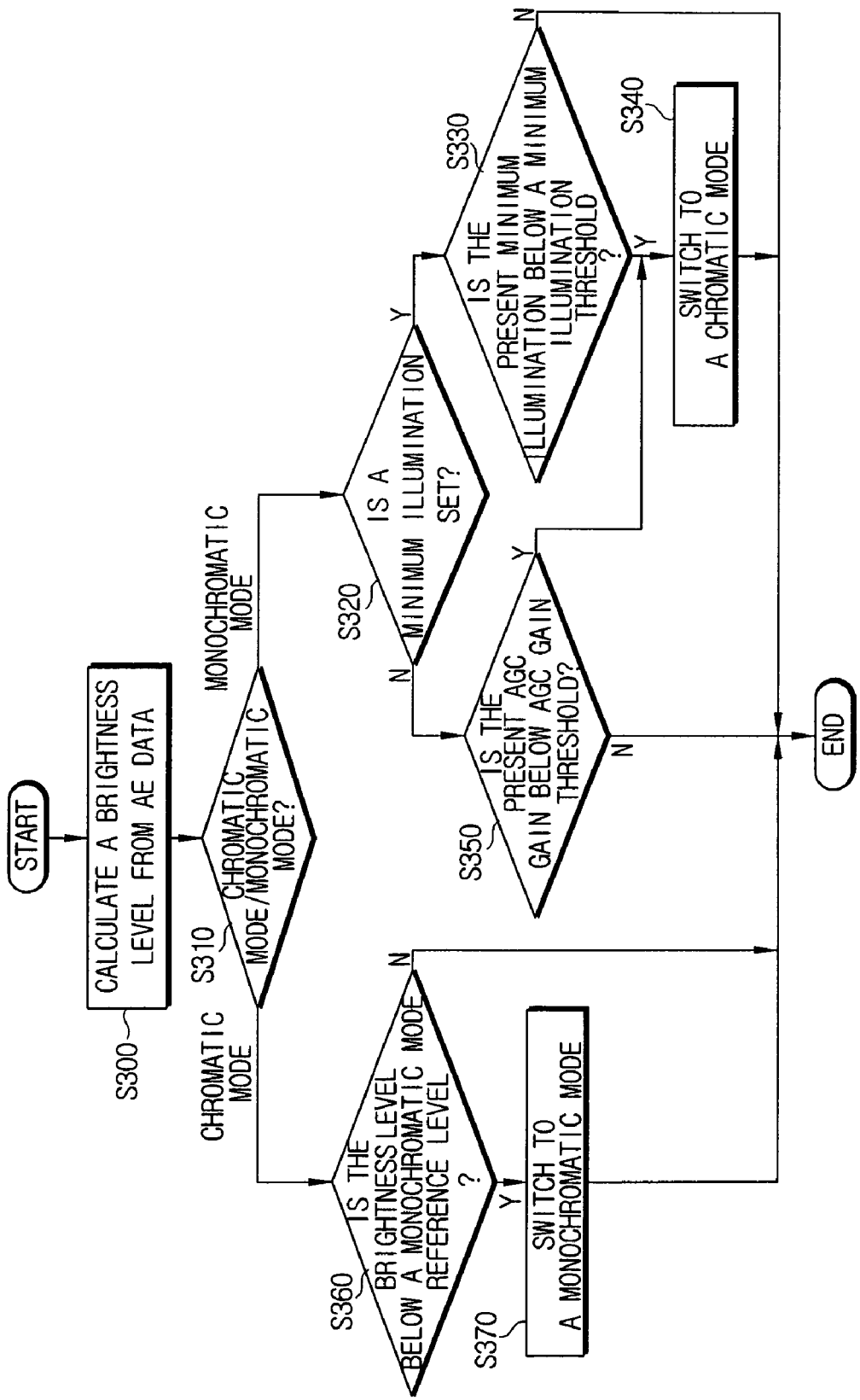
FIG. 3 is a flow chart illustrating a method of switching a mode of a photographing apparatus.

FIG. 3 is a flow chart illustrating operations of a method for switching a mode of a photographing apparatus according to an embodiment of the present invention. Referring to FIGS. 2 and 3, a brightness level is calculated from AE data (S300). Then, it is determined whether to set a chromatic mode or a monochromatic mode (S310).

If a monochromatic mode is set, it is determined whether a minimum illumination is set (S320). If the minimum illumination is set, it is determined whether the present minimum illumination is below a certain minimum illumination threshold (S330). If it is below a certain minimum illumination threshold, a monochromatic mode is switched to a chromatic mode (S340). If the minimum illumination value is greater than the minimum illumination threshold, the mode is not changed. The minimum illumination threshold may be half of the greatest minimum illumination value which can be adjusted. If the minimum illumination value can be adjusted to a maximum of 128 units, the minimum illumination threshold may be set to within 64 units.

If the minimum illumination is not set in the step of S320, it is determined whether the present AGC gain is below a certain AGC gain threshold (S350). The certain AGC gain threshold may be the smallest AGC gain available to an imaging apparatus. If the AGC gain is below a certain AGC gain threshold, operation mode is switched to a chromatic mode, and if over, the present mode is maintained. The chromatic mode switching is performed by switching the filter 210 to the IR filter.

If the present mode is determined to be a chromatic mode in step S310, it is determined whether the brightness level calculated from the step S300 is below a certain monochromatic mode reference level (S360), and if so, the operation mode is switched to a monochromatic mode (S370). If the brightness level is determined to be over the certain monochromatic mode reference level, the operation mode is not switched and kept in the present status. The switching to a monochromatic mode is performed by switching the IR filter corresponding to a chromatic mode to the focus filter corresponding to a monochromatic mode.

According to the above-described embodiment, switching from a chromatic mode to a monochromatic mode is based on the brightness level calculated from AE data (S300). The brightness level when switching the monochromatic mode to the chromatic mode according to an embodiment of the present invention becomes about twice as large as the conventional brightness level. If the brightness level is calculated only based on AE data as in the conventional cases, the brightness level when switching to a chromatic mode can be kept only at around 100 IRE, whereas when switching to a chromatic mode is perceived by the AGC gain and the minimum illumination according to an embodiment of the present invention, the brightness level at the time of switching is more than twice as large as in the conventional method. According to an embodiment of the present invention, the difference between brightness levels at the time of switching to a monochromatic mode and brightness levels at the time of switching to a chromatic mode is sufficiently large such that wrong operation such as a flashing phenomenon can be prevented.

As described above, the difference between a brightness level for switching to a chromatic mode and a brightness level for switching to a monochromatic mode is provided such that a flashing phenomenon, in which mode frequently changes between chromatic and monochromatic modes due to varying lightings, can be prevented. Therefore, wrong operation is prevented, and an improved image quality can be expected.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the invention, and many alternatives, modifications, and variations will be apparent to those skilled in the art.

What is claimed is:

1. A method for switching between chromatic and monochromatic modes in accordance with a brightness of an object being imaged, the method comprising:
   (a) determining whether a present mode is a chromatic mode or a monochromatic mode;
   (b) if the present mode is the monochromatic mode, determining whether a minimum illumination, which controls time for receiving an image signal from an object, is set;
   (c) if the minimum illumination is set, calculating a minimum illumination value;
   (d) determining whether the calculated minimum illumination is below a minimum illumination threshold;
   (e) if the calculated minimum illumination value is below the minimum illumination threshold, switching from the monochromatic mode to the chromatic mode;
   (f) if the minimum illumination is not set in the step (b), calculating an AGC (Auto Gain Control) gain which increments and decrements a brightness value of an image signal;
   (g) determining whether the calculated AGC gain is below an AGC gain threshold; and
   (h) if the calculated AGC gain is below the AGC gain threshold, switching to the chromatic mode.

2. The method as claimed in claim 1, wherein the minimum illumination value is controlled by an AE (Auto Exposure) function which automatically sets an optimized exposure.

3. The method as claimed in claim 2, wherein the minimum illumination threshold is approximately a half of the greatest minimum illumination value available for imaging.

4. The method as claimed in claim 1, wherein the AGC gain is controlled by an AE (Auto Exposure) function which automatically sets an optimized exposure.

5. The method as claimed in claim 4, wherein the AGC gain threshold is the smallest value among the AGC gains available for imaging.

6. The method as claimed in claim 1, wherein the chromatic mode switching comprises switching a filter for imaging to an IR (Infra-red) filter.

7. The method as claimed in claim 1 further comprising:
if the present mode is determined to be the chromatic mode in the step (a), calculating a brightness level of an input image based on the AE function; and
if the calculated brightness level is below a monochromatic mode reference level, switching to the monochromatic mode.

8. The method as claimed in claim 7, wherein the monochromatic mode switching comprises switching a filter for imaging to a focus filter.

9. The method as claimed in claim 1, wherein the imaging is performed by a photographing apparatus comprising a visual surveillance camera.

10. A method for switching chromatic mode of an imaging apparatus which has a function of switching between a chromatic mode and a monochromatic mode based on a brightness of a subject, the method comprising:
(a) determining whether a present mode is a chromatic mode or a monochromatic mode;
(b) if the present mode is determined to be the monochromatic mode, calculating an AGC gain which increments and decrements a brightness value of an image signal;
(c) determining whether the calculated AGC (Auto Gain Control) gain is below an AGC gain threshold; and
(d) if the calculated AGC gain is below the AGC gain threshold, switching to the chromatic mode.

11. An imaging apparatus which switches between chromatic and monochromatic modes in accordance with a brightness of an object being imaged, the apparatus comprising:
a first logic circuit which determines whether a present mode of imaging is a chromatic mode or a monochromatic mode;
a second logic circuit which determines whether a minimum illumination, which controls time for receiving an image signal from an object, is set when the present mode is the monochromatic mode;
a third logic circuit which calculates a minimum illumination value if the minimum illumination is set;
a fourth logic circuit which determines whether the calculated minimum illumination is below a minimum illumination threshold;
a controller which switches imaging between the monochromatic mode and the chromatic mode; and
a CDS/AGC (correlated double sampling hold and automatic gain control) circuit which maintains a brightness value of an image signal for extraction of an optimized image signal,
wherein:
if the calculated minimum illumination value is below the minimum illumination threshold, the controller switches from the monochromatic mode to the chromatic mode;
if the minimum illumination is not set, an AGC (Auto Gain Control) gain which increments and decrements the brightness value of the image signal is calculated;
determination whether the calculated AGC gain is below an AGC gain threshold is performed; and
if the calculated AGC gain is below the AGC gain threshold, the controller switches to the chromatic mode.

12. The imaging apparatus as claimed in claim 11, wherein the controller comprises at least one of the first, second, third and fourth circuits.

13. The imaging apparatus as claimed in claim 11, further comprising a digital signal processor which calculates a brightness level from AE (Auto Exposure) data of an image, wherein the minimum illumination value is controlled by an AE (Auto Exposure) function which automatically sets an optimized exposure.

14. The imaging apparatus as claimed in claim 13, wherein the minimum illumination threshold is approximately a half of the greatest minimum illumination value available for imaging.

15. The imaging apparatus as claimed in claim 11, wherein the AGC gain is controlled by an AE (Auto Exposure) function which automatically sets an optimized exposure.

16. The imaging apparatus as claimed in claim 15, wherein the AGC gain threshold is the smallest value among the AGC gains available for imaging.

17. The imaging apparatus as claimed in claim 11, further comprising a filter module, the filter module comprising an IR (Infra-red) filter, wherein the controller switching to the chromatic mode comprises switching the filter module to the IR filter.

18. The imaging apparatus as claimed in claim 11 further comprising a fifth logic circuit which calculates a brightness level of an input image based on the AE function, wherein:
if the present mode is determined to be the chromatic mode, the brightness level of the input image is calculated based on the AE function; and
if the calculated brightness level is below a monochromatic mode reference level, the controller switching to the monochromatic mode.

19. The imaging apparatus as claimed in claim 18, further comprising a filter module, the filter module comprising a focus filter wherein the controller switching to the monochromatic mode comprises switching the filter module to the focus filter.

20. The imaging apparatus as claimed in claim 11, comprising at least one of a photographing apparatus and a visual surveillance camera.

21. A module for switching a chromatic mode of an imaging apparatus which has a function of switching between the chromatic mode and a monochromatic mode based on a brightness of a subject, the module comprising:
a first logic circuit determining whether a present mode is a chromatic mode or a monochromatic mode;
a second logic circuit which calculates an AGC (Auto Gain Control) gain which increments and decrements a brightness value of an image signal;
a third logic circuit which determines whether the calculated AGC gain is below an AGC gain threshold; and
a controller which switches the present mode between a chromatic mode and a monochromatic mode;
wherein:
if the present mode is determined to be the monochromatic mode, the AGC gain is calculated;
determination whether the calculated AGC gain is below an AGC gain threshold is made; and
if the calculated AGC gain is below the AGC gain threshold, the controller performs switching to the chromatic mode.

22. A photographing apparatus comprising a module as claimed in claim 21.

23. A visual surveillance camera comprising a module as claimed in claim 21.

* * * * *